United States Patent
Helenic et al.

(10) Patent No.: US 6,983,342 B2
(45) Date of Patent: Jan. 3, 2006

(54) HIGH SPEED OC-768 CONFIGURABLE LINK LAYER CHIP

(75) Inventors: Victor Helenic, Shrewsbury, MA (US); Clinton P. Seeman, Blackstone, MA (US); Danny C. Vogel, Sudbury, MA (US)

(73) Assignee: LSI Logic Corporation, Milpitas, CA (US)

( * ) Notice: Subject to any disclaimer, the term of this patent is extended or adjusted under 35 U.S.C. 154(b) by 454 days.

(21) Appl. No.: 10/266,232

(22) Filed: Oct. 8, 2002

(65) Prior Publication Data

US 2004/0068593 A1    Apr. 8, 2004

(51) Int. Cl.
*G06F 13/14*    (2006.01)
*H04Q 11/00*    (2006.01)

(52) U.S. Cl. ...................... 710/305; 370/366

(58) Field of Classification Search ............... 710/107, 710/305, 316, 317; 370/360, 366, 401, 466
See application file for complete search history.

(56) References Cited

U.S. PATENT DOCUMENTS

| | | | | |
|---|---|---|---|---|
| 5,379,289 A | * | 1/1995 | DeSouza et al. | 370/230 |
| 6,247,083 B1 | * | 6/2001 | Hake et al. | 710/107 |
| 6,490,281 B1 | * | 12/2002 | Abler et al. | 370/394 |
| 6,654,383 B2 | * | 11/2003 | Haymes et al. | 370/466 |
| 6,810,520 B2 | * | 10/2004 | Lu et al. | 719/310 |
| 2003/0110344 A1 | * | 6/2003 | Szczepanek et al. | 711/100 |

OTHER PUBLICATIONS

Optical Internetworking Forum (OIF).*
The SPI-5 Spec: A Tutorial, Richard Cam, Mar. 28, 2002.*
Alaska Quad, Marvell Semiconductor, Apr. 2002.*
Next Gen Sonet Silicon, Jun. 19, 2002.*
10/100/1000MBPS Ethernet MAC Core, More Than IP, Jul. 2002.*

* cited by examiner

*Primary Examiner*—Khanh Dang
(74) *Attorney, Agent, or Firm*—Christopher P. Maiorana, P.C.

(57) ABSTRACT

An integrated circuit comprising a plurality of link layer controllers. The plurality of link layer controllers may be configured to operate independently in a first mode and cooperatively in a second mode.

21 Claims, 9 Drawing Sheets

HIGH SPEED OC-768 CONFIGURABLE LINK LAYER CHIP

FIELD OF THE INVENTION

The present invention relates to network chip architecture generally and, more particularly, to a high speed OC-768 configurable link layer chip.

BACKGROUND OF THE INVENTION

Each channel of a conventional customer configurable network interface utilizes large field programmable gate arrays (FPGAs) for the media access controller (MAC) layer and glue, application specific integrated circuits (ASICs) or FPGAs for the forward error correction (FEC) layer and standard products for the serializer/de-serializer (SERDES). The conventional architecture enables a fairly rapid time to market for custom solutions, but at a high cost, a large board area and a large power budget.

OC-768 devices will be fielded in wide area network (WAN), storage area network (SAN), and local area network (LAN) applications. A fast time to market is desirable in all the applications. However, each application can have slightly different configurations. For example, in the WAN application, each optical customer can utilize a proprietary forward error correction (FEC) algorithm, while in the SAN application different manners of packet filtering can be desirable on each channel.

It would be desirable to provide a platform that is rapidly customizable for the portions of logic that vary between the WAN, SAN, and LAN applications.

SUMMARY OF THE INVENTION

The present invention concerns an integrated circuit comprising a plurality of link layer controllers. The plurality of link layer controllers may be configured to operate independently in a first mode and cooperatively in a second mode.

The objects, features and advantages of the present invention include providing a high speed OC-768 configurable link layer chip that may (i) have a reasonable power budget, (ii) be implemented in a single package, (iii) provide an integrated design, (iv) provide a single base architecture that satisfies multiple markets, (v) provide a single base architecture that satisfies multiple slightly different applications of a single customer, (vi) reduce engineering costs, (vii) provide easier parts management and/or (viii) provide a solution where the customer designs only the customer value added areas.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1A:
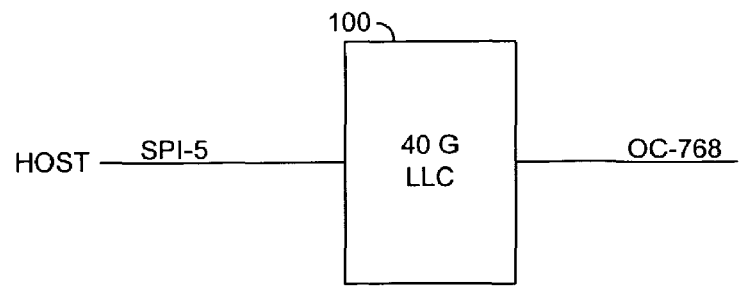
FIGS. 1A and 1B are block diagrams of example configurations of a preferred embodiment of the present invention.
Figure 1B:
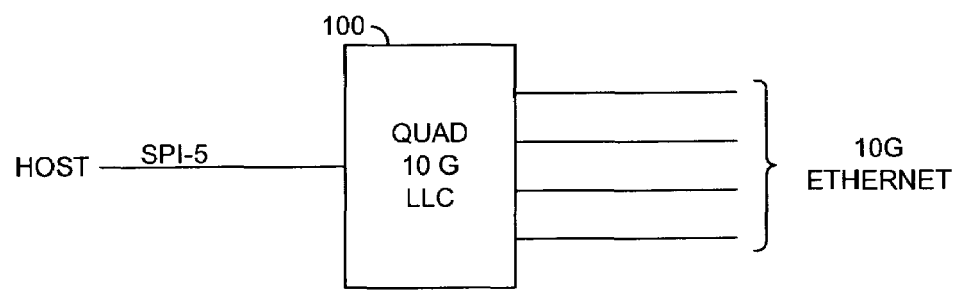

Referring to FIGS. 1A and 1B, block diagrams of a circuit 100 are shown in accordance with a preferred embodiment of the present invention. The circuit 100 may be implemented, in one example, as a link layer chip. The circuit 100 may be configured, in a first mode, as a 40 Gb/s device (FIG. 1A) that may run as, in one example, an OC-768 compliant link layer chip and, in a second mode, as a quad 10 Gb/s device (FIG. 1B). The circuit 100 may be rapidly customized to support different applications in storage area networks (SAN), wide area networks (WAN) and/or large area networks (LAN). The circuit 100 may be configured to support a number of communication protocols (e.g., WIS, SPI-5, SPI-4, XGMII, XAUI, etc.). The circuit 100 may provide user customizable logic areas that may be configured to provide a number of custom (or proprietary) functions (e.g., forward error correcting (FEC), packet filtering, host interface bus protocol management, etc.). The circuit 100 may be implemented as a single integrated circuit. The circuit 100 is generally configured to couple a host device (or system) to a synchronous optical network (SONET). In one example, the circuit 100 may be configured to provide an OC-768 compliant interface.

Figure 2:
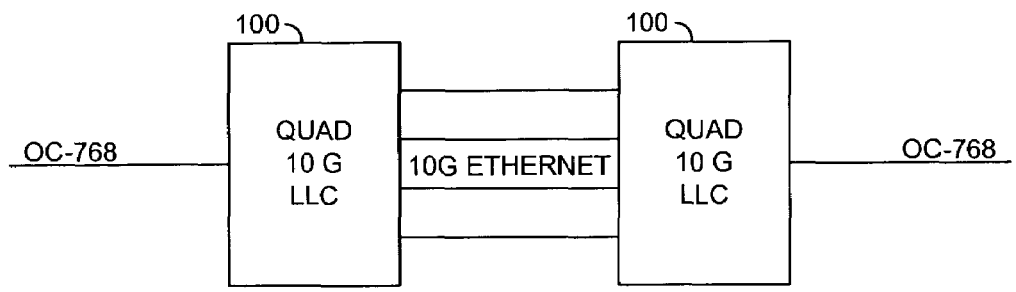
FIG. 2 is a block diagram of an example application in accordance with a preferred embodiment of the present invention.

Referring to FIG. 2, an example application in accordance with a preferred embodiment of the present invention is shown. In one example, a number of circuits 100 may be coupled together to provide a link in a high speed optical network (e.g., OC-768) via a number of lower speed links (e.g., 10 Gb/s Ethernet). The circuits 100 may be configured to distribute data from the high speed network on the number of lower speed links and recombine the data from the lower speed links for presentation to the high speed network.

Figure 3:
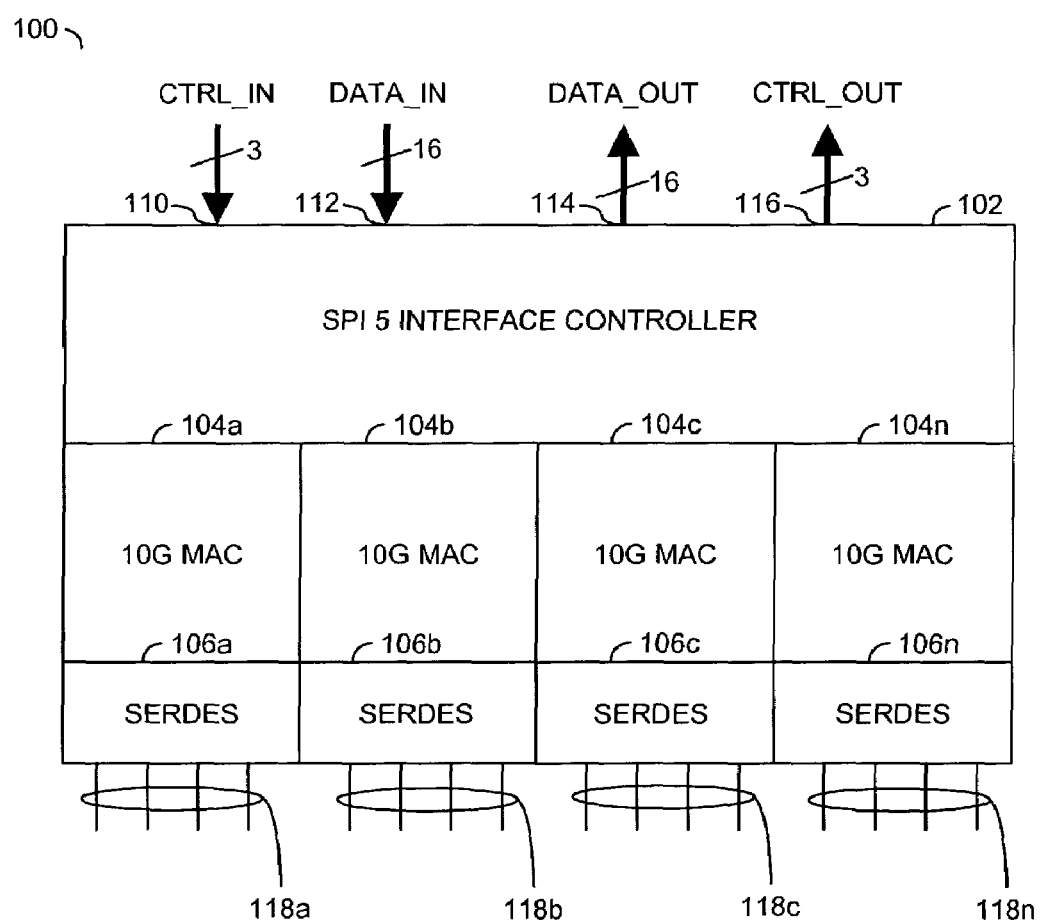
FIG. 3 is a block diagram of a preferred embodiment of the present invention.

Referring to FIG. 3, a detailed block diagram of a circuit 100 in accordance with a preferred embodiment of the present invention is shown. In one example, the circuit 100 may comprise a circuit 102, a number of circuits 104a–n and a number of circuits 106a–n. The circuit 102 may be implemented as an interface controller. The circuits 104a–n may be implemented as link layer controllers. The circuits 106a–n may be implemented as serializer/deserializer (SERDES) circuits.

The circuit 102 may be configured to implement one or more communication protocols (e.g., SPI-4, SPI-5, etc.). The circuit 102 may have an input 110 that may receive one or more control signals (e.g., CTRL_IN), an input 112 that may receive one or more data signals (e.g., DATA_IN), an output 114 that may present one or more data signals (e.g., DATA_OUT) and an output 116 that may present one or more control signals (e.g., CTRL_OUT). The interface controller 102 is generally coupled to the circuits 104a–n. The circuit 102 may be configured to operate the circuits 104a–n cooperatively as a single high speed communication channel, in a first mode, and independently as a plurality of lower-speed communication channels, in a second mode.

The circuits 104a–n may be implemented, in one example, as media access controllers (MACs). Alternatively, the circuits 104a–104n may be implemented as framers. However, other types and/or combinations of link layer controllers may be implemented accordingly to meet the design criteria of a particular application. Each of the circuits 104a–n is generally coupled between the circuit 102 and a respective one of the circuits 106a–n. The couplings (or interfaces) between the circuits 104a–n and the circuits 102 and 106a–n are generally customizable (or configurable) to meet the design criteria of a particular application.

The circuits 106a–n may be implemented, in one example, as serializer/deserializer (SERDES) circuits. Each of the circuits 106a–n generally has a respective input/output interface 118a–n. The circuits 106a–n may be configured to support one or more communication protocols (e.g., WIS, SPI-5, SPI-4, XGMII, XAUI, etc.).

Figure 4:
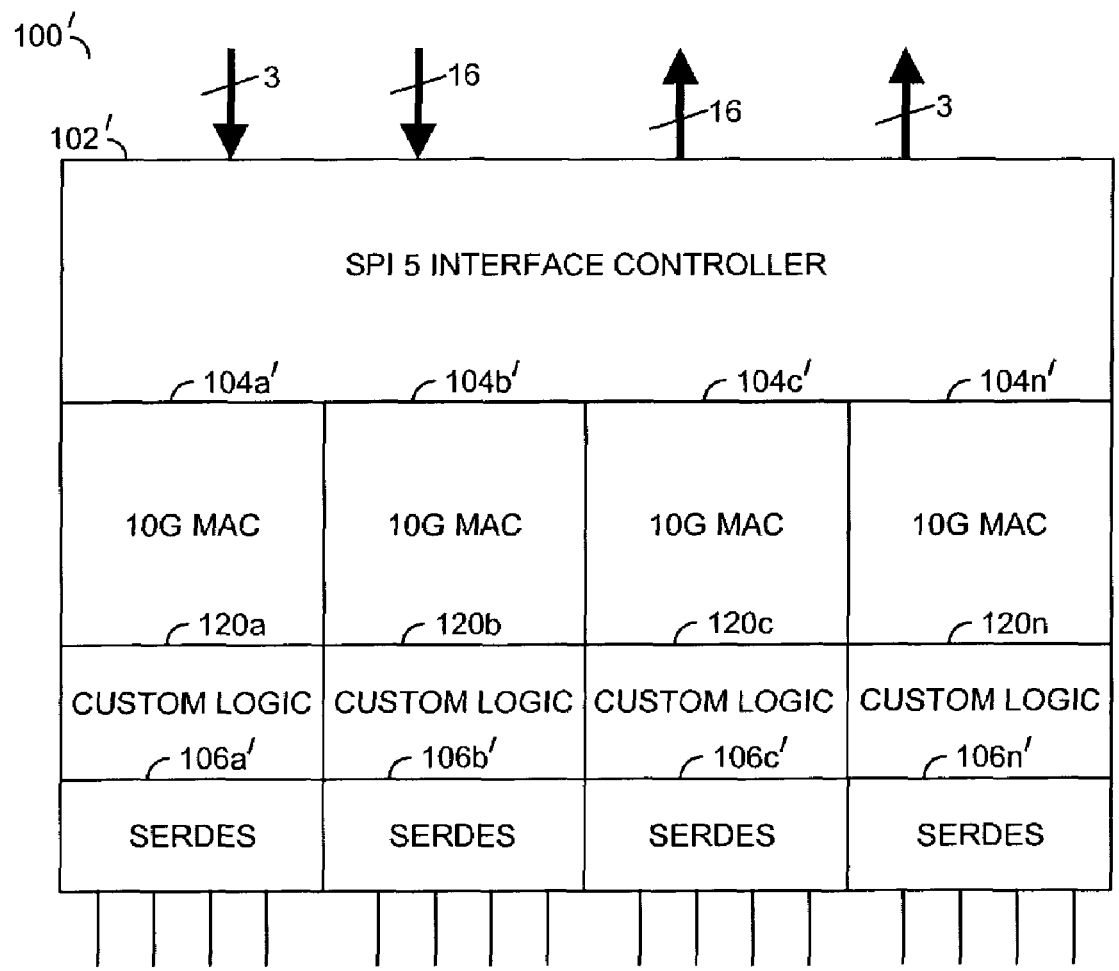
FIG. 4 is a detailed block diagram of another preferred embodiment of the present invention.

Referring to FIG. 4, a detailed block diagram of a circuit 100' is shown illustrating an alternative embodiment of the present invention. The circuit 100' may comprise an interface controller 102', a number of link layer controllers 104a'–104n', and a number of SERDES 106a'–106n. The circuit 100' may be implemented similarly to the circuit 100 except that each of the link layer controllers 104a'–104n' may be coupled to the respective serializer/deserializer 106a'–106n' via a respective customizable logic block 120a–n. The customizable logic blocks 120a–n may be configured, in one example, to provide proprietary (user specific) interface circuitry (e.g., forward error correction (FEC), packet filtering, etc.). The customizable logic blocks 120a–n may be implemented with one or more diffusion layers that may comprise structures (e.g., A-cells, standard cells, hard macros, sea-of-gates, gate array, etc.) that may form transistors, logic, memory and/or other custom circuitry with the addition of one or more metal layers (e.g., wiring, routing, etc.). In one example, the customizing metal layers may be deposited at a different time (e.g., subsequent manufacturing step) than the fabrication of the circuit 100'. For example, the circuit 100' may be fabricated and stored for customization at a later date.

Figure 5:
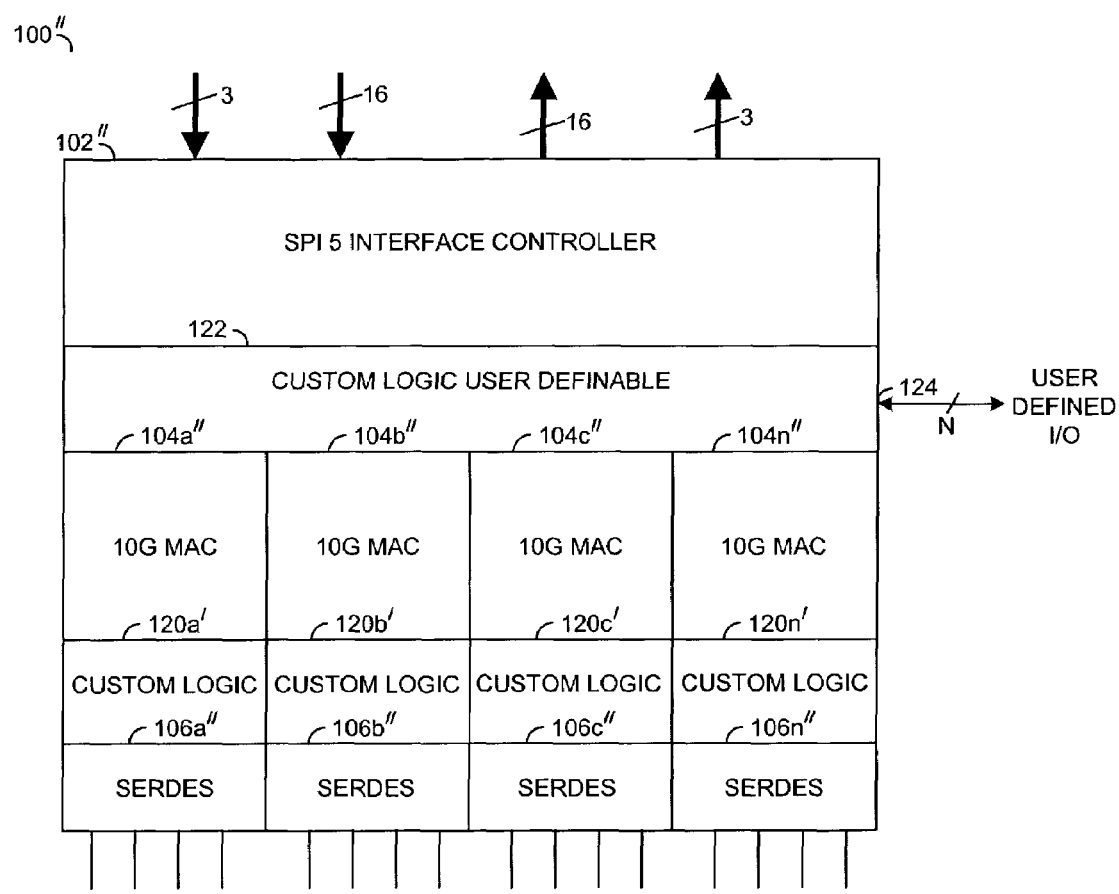
FIG. 5 is a block diagram of yet another preferred embodiment of the present invention.

Referring to FIG. 5, a block diagram of a circuit 100" is shown illustrating yet another preferred embodiment of the present invention. The circuit 100" may comprise a circuit 102", a number of circuits 104a"–104n", a number of circuits 106a"–106n", a number of customizable logic blocks 120a'–120n' and a user customizable logic block 122. The circuit 100" be implemented similarly to the circuit 100' of FIG. 4 except that the user customizable logic block 122 may couple the circuit 102" and the circuits 104a"–104n". The customizable logic blocks 120a'–120n' and 122 may be implemented similarly to the blocks 120a–n (described above in connection with FIG. 3). For example, the user customizable logic blocks 120a'–120n' and 122 may comprise gates, memory, etc. that may allow for flexible designs such as statistic gathering for the link layer controllers 104a"–104n". In general, the customizable logic blocks 120a'–120n' and 122 provide for user definable customization of the interactions between the circuits 102", 104"–104n" and 106a"–106n" to meet the design criteria of particular applications.

The customizable block 122 may provide a number of user definable input/outputs 124. In general, the present invention may define a set of input/outputs, memory and logic that provides standard options of a link layer chip design while leaving room for customization to include user specific elements, features and/or functions. For example, customized (or proprietary) error detection, tracking and/or correction may be implemented via the customizable logic blocks 120a'–120n' and 122.

Figure 6:
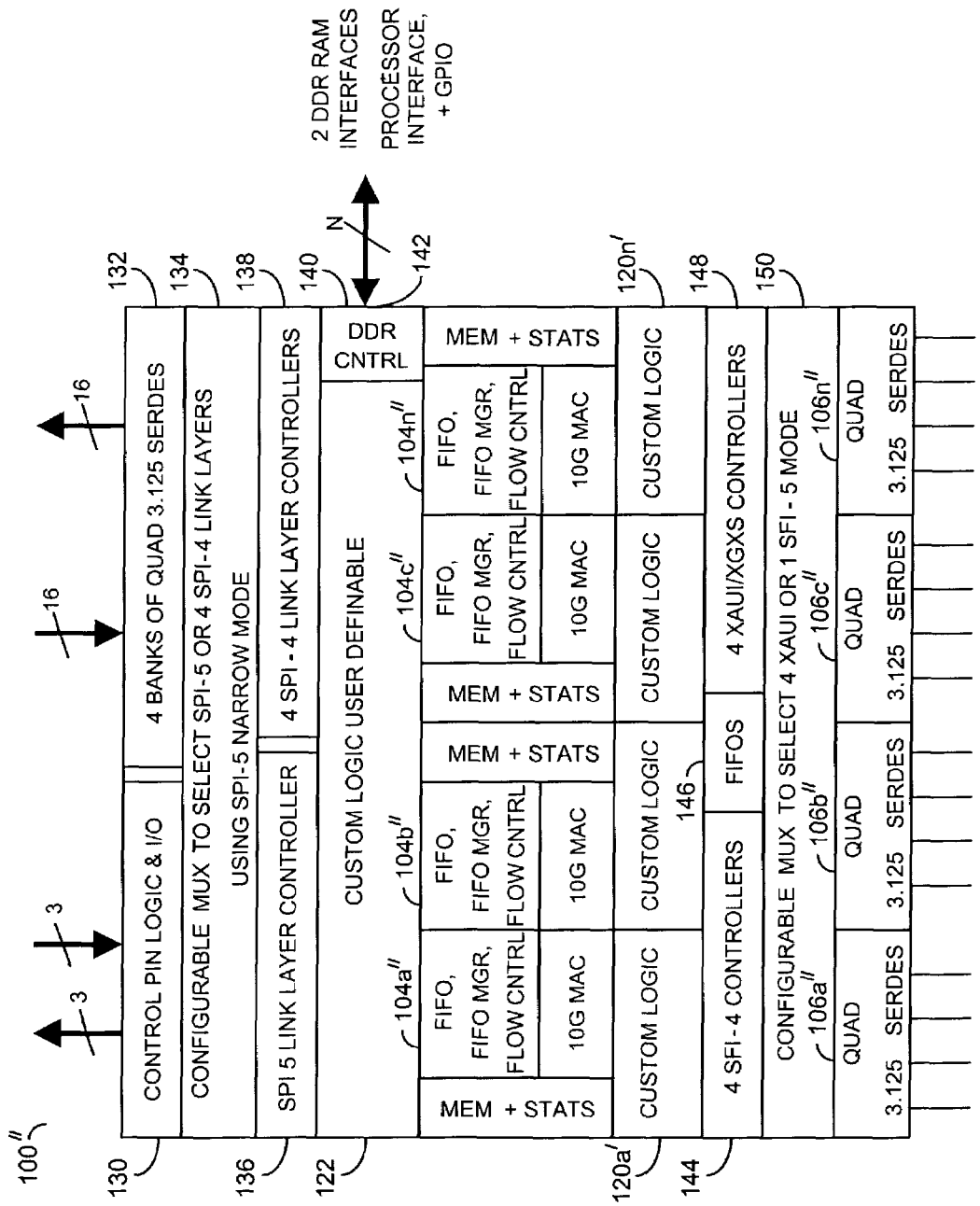
FIG. 6 is a more detailed block diagram of an example application of the embodiment of FIG. 5.

Referring to FIG. 6, a more detailed block diagram of an example implementation of the circuit 100" of FIG. 5 is shown. In one example, the circuit 102" may comprise a control pin logic and I/O block 130, a number of banks of quad serializer/deserializers 132, a configurable multiplexer circuit 134 that may be configured to select between a number of protocols (e.g., SPI-5, SPI-4, link layers using SPI-5 narrow mode, etc.), an SPI-5 link layer controller 136 and a number of (e.g., four) SPI-4 link layer controllers 138. The circuit 100" may comprise a double data rate control circuit 140 that may provide one or more interfaces 142 to, for example, one or more double data rate (DDR) random access memory (RAM) interfaces, a processor interface and/or one or more general purpose input/outputs or interfaces (not shown). Each of the circuits 104a"–104n" may comprise, in one example, a FIFO, a FIFO manager, flow control logic, a media access controller and a memory and statistics support. The circuit 100" may further comprise a number of (e.g., four) SFI-4 controllers 144, a number of FIFOs 146, a number of controllers (e.g., XAUI/XGXS) 148, and a configurable multiplexer circuit 150 that may be configured to select between, for example, an SFI-4, a XAUI and/or a SFI-5 mode. The circuits 106a"–106n" may be implemented, in one example, as quad 3.125 GB/s SERDES circuits. In one example, the circuits 134, 136, 138 and 140 may be implemented in the customizable logic block 122 and the circuits 144, 146, 148 and 150 may be implemented via the customizable logic blocks 120a"–120n".

Figure 7:
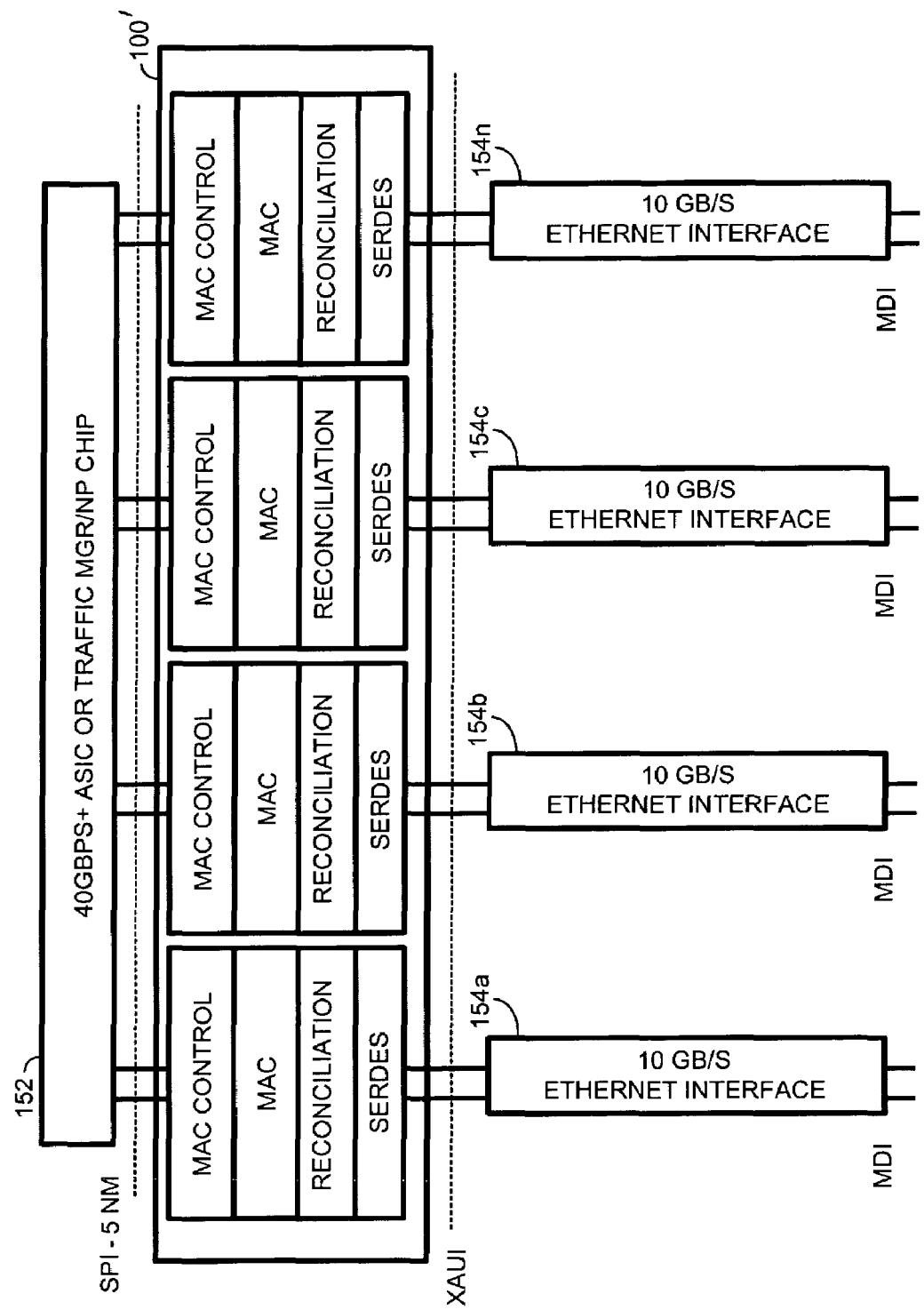
FIG. 7 is a more detailed block of an example implementation of the embodiment of FIG. 5.

Referring to FIG. 7, a block diagram illustrating another example application of the circuit 100" of FIG. 5 is shown. In one example, the interface controller 102" may be configured to couple the circuit 100" to an application specific integrated circuit (ASIC), traffic manager or network processor (NP) chip 152. The customizable logic block 122 may be configured to provide control of the MACS 104a"–104n" and the logic blocks 120a"–120n" may be configured to provide a reconciliation function between the respective MACs 104a"–104n" and the respective serializer/deserializers 106a"–106n". Each of the serializer/deserializers 106a"–106n" may be configured to support an interface protocol (e.g., XAUI, etc.) for communicating with a respective media dependent interface (MDI) 154a–154n.

In one example, each of the MDIs 154a–154n may be implemented as an electrical-to-optical interface (e.g., a XENPAK compliant 10 Gb/s Ethernet (10 GbE) transceiver). For example, the circuits 154a–154n may be implemented as optical modules incorporating a complete transmit and receive physical layer functionality from a 10 Gb/s optical interface to an XAUI (e.g., four channels X 3.125 Gb/s electrical interface). The circuits 154a–154n may be further configured to provide 8B/10B and/or 64B/66B coding and a MDIO control interface.

In one example, the serializer/deserializers 106a"–106n" may be configured to support one or more different bus protocols (e.g., XAUI, SPI-5, etc.). For example, the serializer/deserializer 106a"–106n" may be implemented with ethernet (e.g., GigaBlaze) and/or optical (e.g., HyperPHY) cores (GigaBlaze and HyperPHY are trademarks of LSI Logic Corp., Milpitas, Calif.). The present invention may reduce the number of pins used for coupling the traffic manager and MAC chips.

Figure 8:
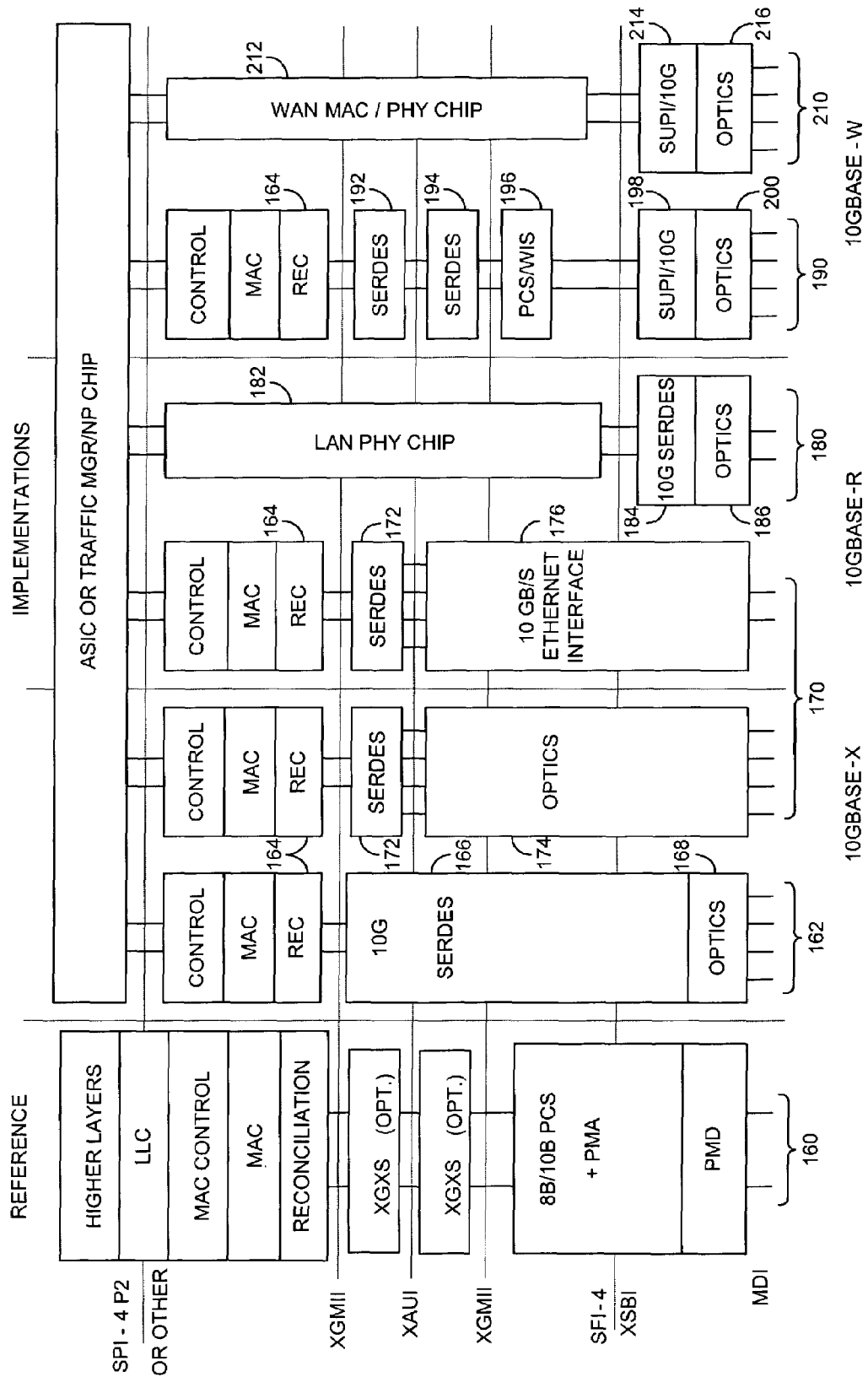
FIG. 8 is a block diagram of various example channel implementation in accordance with the present invention.

Referring to FIG. 8, a block diagram illustrating a number of examples of ethernet configurations that may be implemented with a preferred embodiment of the present invention. A reference ethernet implementation may include a number of functions and protocols (e.g., column 160). For example, a link layer controller may communicate with higher layers using the SPI-4 P2 protocol or some other protocol. A reconciliation layer may communicate with a subsequent layer (or device) via a 10 GB/s medium independent interface (XGMII) protocol. In one example, optional 10 GB/s extender sublayers (XGXS) may be implemented to convert the short run XGMII protocol to a long run 10 GB/s attachment unit interface (XAUI) protocol and back again. An encoding/decoding/error correcting layer may include a physical coding sublayer (PCS), a physical medium attachment (PMA) and support for the XGMII protocol, as well as SFI-4 and XSBI protocols. The encoding/decoding/error correcting layer may communicate with a physical medium dependent interface (PMD) layer that provides the physical network connection via a medium dependent interface (MDI) protocol.

In one example, the higher layers of an ethernet implementation may be provided with an application specific integrated circuit (ASIC), a traffic manager or an NP chip that may be interfaced with the present invention. In general, the present invention may provide a flexible platform that generally supports implementing various ethernet layers that communicate with the higher layers via the link layer in a number of ways. The present invention may provide, for example, a cost effective building block for implementing high speed (e.g., 40 GB/s) optical networks.

Referring to column 162 of FIG. 8, the reconciliation layer 164 may communicate with a 10 GB/s serializer/deserializer 166 via the XGMII protocol. The serializer/deserializer 166 may communicate with the physical layer via an optical interface 168. The serializer/deserializer 166 may be configured to manage the error correction operations and physical medium attachment functions.

Referring to column 170 of FIG. 8, the reconciliation layer 164 may communicate with a serializer/deserializer 172 via an XMGII protocol. The serializer/deserializer 172 may be configured to communicate via an XAUI protocol with, for example, an optical interface 174 (e.g., in a 10G Ethernet Forum 10GBASE-X channel) or an electrical-to-optical interface 176 (e.g., in a 10G Ethernet Forum 10GBASE-R channel). The interfaces 174 and 176 may be configured to provide the error correction, physical medium attachment and physical medium dependent interface functions.

Referring to column 180 of FIG. 8, an alternative 10G Ethernet Forum 10GBASE-R implementation may comprise a LAN PHY chip (or core) 182 configured to couple (i) to the higher layers via an SPI-4 P2 or other interface and (ii) to a serializer/deserializer 184 via an SFI-4 or XSBI interface. The serializer/deserializer 184 may provide the physical medium attachment interface for coupling to an optical interface 186. The optical interface 186 generally provides the physical medium dependent interface.

Referring to column 190 of FIG. 8, a 10G Ethernet Forum 10GBASE-W implementation may comprise a serializer/deserializer 192, a serializer/deserializer 194, a physical coding sublayer (PCS) 196, a single universal physical medium dependent (PMD) interface (SUPI) 198 and an optical link 200. The serializer/deserializer 192 may connect (i) to the reconciliation layer 164 via the XGMII protocol and (ii) to the serializer/deserializer 194 via an XAUI protocol. The serializer/deserializer 194 may connect to the PCS 196 via the XGMII protocol. The PCS 196 may connect to the SUPI 198 via an SFI-4 or XSBI protocol. The SUPI 198 may provide the interface to the optical link to the physical layer.

Referring to column 210 of FIG. 8, an alternative implementation of the 10G Ethernet Forum 10GBASE-W channel may comprise a WAN MAC/PHY chip 212 coupled between the higher layers and a SUPI 214. The SUPI 214 may be configured to couple the channel to the physical layer via an optical link 216.

Figure 9:
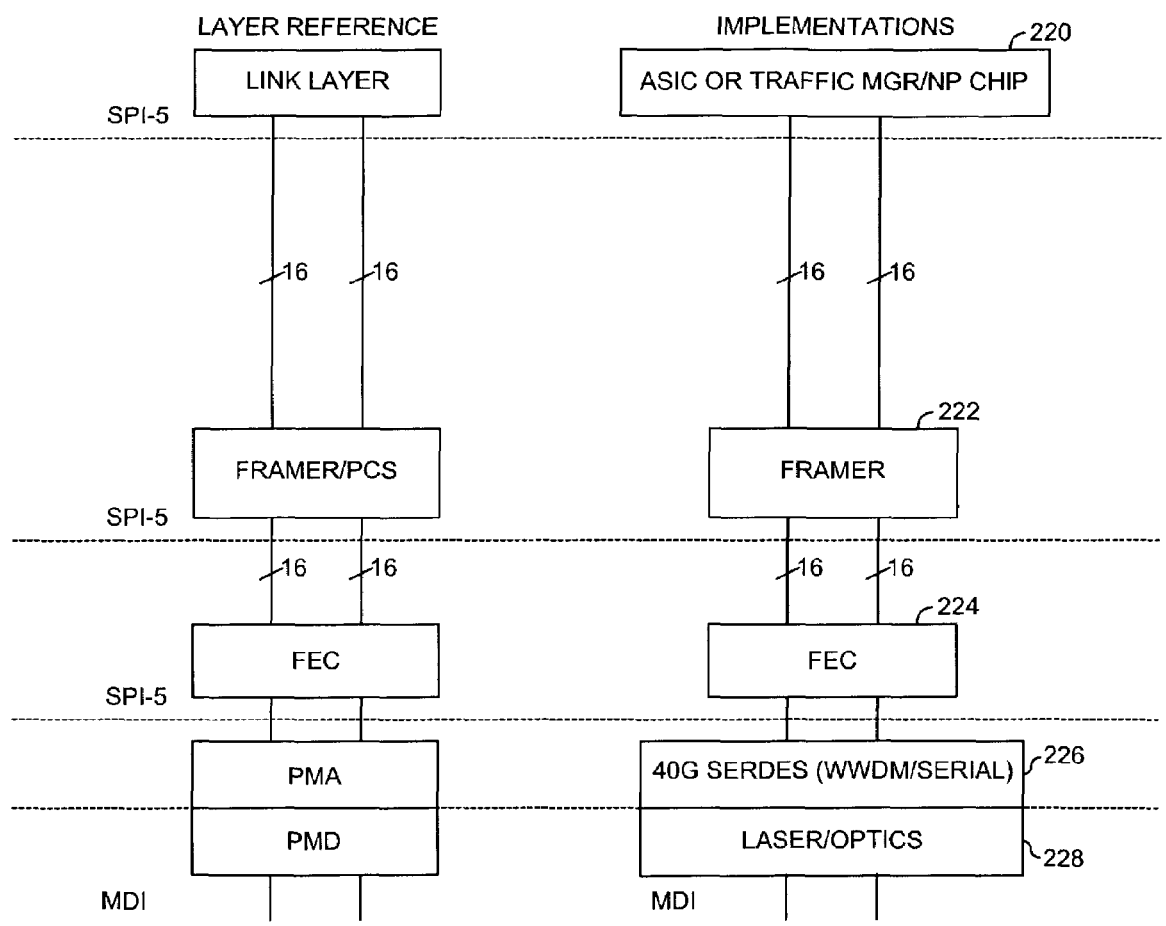
FIG. 9 is a block diagram of an implementation of the embodiment of FIG. 1A.

Referring to FIG. 9, a block diagram illustrating an alternative example link layer implementation in accordance with a preferred embodiment of the present invention is shown. The present invention may be configured to implement a 40 GB/s SPI-5 link layer. For example, the link layer may be implemented in an ASIC or traffic manager/NP chip 220. The circuit 100 may be configured to provide a framer 222, a forward error correction (FEC) block 224, and a 40 GB/s serializer/deserializer (SERDES) 226. The framer 222 may be implemented in (i) dedicated logic, (ii) customizable user defined logic, or (iii) a combination of dedicated and custom logic. The FEC 224 may be implemented in customizable user defined logic (e.g., the custom logic described in connection with FIGS. 3–5 above).

The framer 222 may be coupled (i) to the ASIC 220 via an SPI-5 protocol and (ii) to the FEC 224 via an SFI-5 protocol. The FEC 224 may be coupled to the SERDES 226 via an SFI-5 protocol. The SERDES 226 may be configured to couple the implementation to the physical layer via a laser/optical physical medium dependent interface 228.

Figure 10:
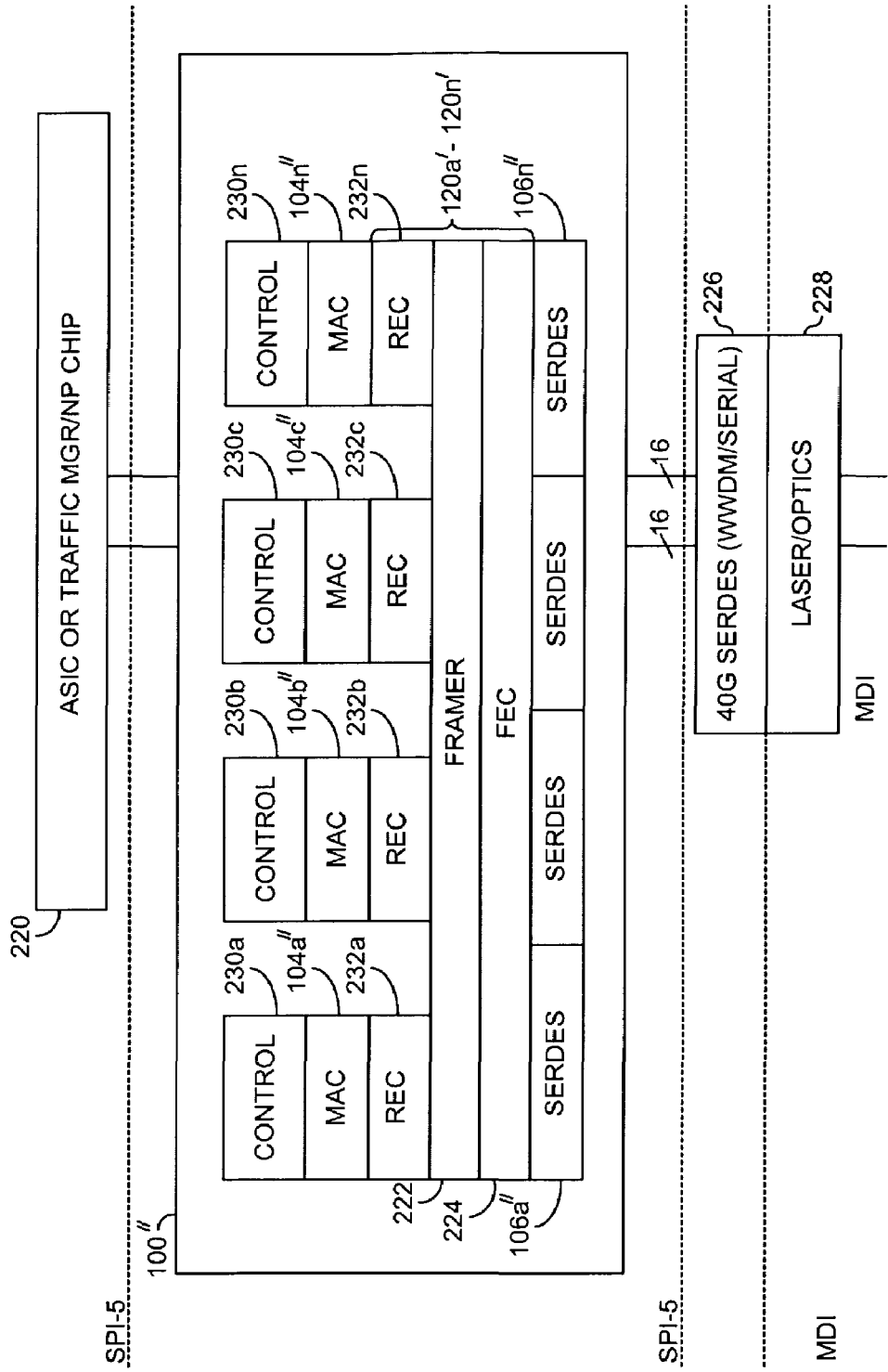
FIG. 10 is an alternative embodiment of the embodiment of FIG. 1A.

Referring to FIG. 10, a more detailed block diagram of the example implementation of FIG. 9 is shown. In one example, the circuit 100" (described in more detail in connection with FIGS. 5 and 6 above) may be configured as a 40 GB/s SPI-5 implementation. The circuit 100" may be coupled via an SPI-5 interface to an ASIC or traffic manager/NP chip that may be configured to implement higher network layers of, for example, an OC-768 compliant network.

The circuit 100" may be configured to provide a number of MAC control blocks 230, a number of MACs 104a"–104n", a number of reconciliation blocks 232a–232n, the framer block 222, the FEC block 224, and a number of SERDES 106a"–106n". In one example, the reconciliation blocks 232a–232n, the framer 222, and the FEC block 224 may be implemented in the custom logic blocks 120a'–120n'. The MAC control blocks 230a–230n may be implemented in the custom logic 122. However other configurations and resource assignments may be implemented to meet the design criteria of a particular application. The circuit 100" may be coupled to the 40 GB/s SERDES 226 via an SFI-5 interface.

While the invention has been particularly shown and described with reference to the preferred embodiments thereof, it will be understood by those skilled in the art that various changes in form and details may be made without departing from the spirit and scope of the invention.

What is claimed is:

1. An integrated circuit comprising:
   an interface controller configured to implement one or more communication protocols;
   a plurality of first link layer controllers coupled to said interface controllers;
   a plurality of first serializer/deserializer (SERDES) circuits; and
   a plurality of first customizable logic circuits each coupling one of said plurality of link layer controllers with one of said plurality of serializer/deserializer circuits, wherein said integrated circuit is implemented as a single chip and said plurality of link layer controllers operate independently to provide a plurality of low-speed communication channels in a first mode and cooperatively to provide a single high-speed communication channel in a second mode.

2. The integrated circuit according to claim 1, wherein:
said interface controller is configured to couple said plurality of first link layer controllers to a host.

3. The integrated circuit according to claim 1, wherein each of said first link layer controllers comprise user customizable logic.

4. The integrated circuit according to claim 1, further comprising a second customizable logic circuit coupling said interface controller and said plurality of first link layer controllers.

5. The integrated circuit according to claim 1, wherein one or more of said first link layer controllers comprises a media access controller (MAC).

6. The integrated circuit according to claim 1, wherein one or more of said first link layer controllers comprises a framer.

7. The integrated circuit according to claim 1, wherein one or more of said plurality of first serializer/deserializer (SERDES) circuits is configured to support at least one of a WIS, SPI-4, SPI-5, XGMII and XAUI protocols.

8. The integrated circuit according to claim 2, wherein said interface controller supports one or more protocols.

9. The integrated circuit according to claim 2, wherein said interface circuit is configured to support SPI-5 protocol.

10. The integrated circuit according to claim 1, wherein said interface controller comprises:
a plurality of second serializer/deserializer circuits;
a configurable multiplexer circuit configured to select a first protocol in said first mode and a second protocol in said second mode;
a plurality of second link layer controllers configured to operate with said first protocol; and
a third link layer controller configured to operate with said second protocol.

11. The integrated circuit according to claim 1, further comprising:
a plurality of first controllers coupled to said plurality of first link layer controllers and configured to operate with a first protocol;
a plurality of second controllers coupled to said plurality of first link layer controllers and configured to operate with a second protocol; and
a configurable multiplexer circuit configured (i) to couple said plurality of first serializer/deserializer circuits, said plurality of first controllers and said plurality of second controllers and (ii) to select said first protocol in said first mode and said second protocol in said second mode.

12. An integrated circuit comprising:
means for interfacing said integrated circuit to a host;
means for implementing a plurality of channels in a link layer coupling said host to a network;
means for interfacing said integrated circuit to said network comprising a plurality of serializer/deserializer circuits; and
means for implementing user customizable logic coupling each of said plurality of serializer/deserializer circuits with one of said plurality of channels in said link layer, wherein said integrated circuit is implemented as a single chip and said plurality of channels in said link layer are configurable to operate independently to provide a plurality of low-speed communication channels in a first mode and cooperatively to provide a single high-speed communication channel in a second mode.

13. A method for implementing a link layer chip, comprising the steps of:
providing a plurality of link layer controllers;
providing an interface controller configured to couple said plurality of link layer controllers to a host;
providing a plurality of serializer/deserializer circuits each configured to couple one of said link layer controllers to one of a plurality of serial communication channels; and
providing a first user customizable logic coupled between said plurality of link layer controllers and said plurality of serializer/deserializer circuits, wherein said plurality of link layer controllers is configured to operate independently to provide a plurality of low-speed communication channels in a first mode and cooperatively to provide a single high-speed communication channel in a second mode.

14. The method according to claim 13, wherein each of said link layer controllers is user customizable.

15. The method according to claim 13, further comprising:
providing a second user customizable logic coupled between said interface controller and said plurality of link layer controllers.

16. The method according to claim 13, further comprising:
configuring said link layer controllers to support ethernet protocols.

17. The method according to claim 13, further comprising:
configuring said link layer controllers to support optical and ATM network protocols.

18. The method according to claim 13, further comprising:
configuring said serializer/deserializer circuits to support at least one of a WIS, SPI-4, SPI-5, XGMII, and XAUI protocols.

19. The method according to claim 18, wherein said serializer/deserializer circuit are configured to support a plurality of said protocols.

20. The method according to claim 13, further comprising:
providing a plurality of first controllers coupled to said plurality of link layer controllers and configured to operate with a first protocol;
providing a plurality of second controllers coupled to said plurality of link layer controllers and configured to operate with a second protocol; and
providing a configurable multiplexer circuit configured (i) to couple said plurality of serializer/deserializer circuits, said plurality of first controllers and said plurality of second controllers and (ii) to select said first protocol in said first mode and said second protocol in said second mode.

21. The method according to claim 13, wherein said first user customizable logic is customizable during a separate manufacturing step.

* * * * *